United States Patent [19]

Fryer et al.

[11] Patent Number: 4,634,138
[45] Date of Patent: Jan. 6, 1987

[54] FOLDING BICYCLE

[76] Inventors: George E. Fryer, 15 Maplewood Ave., Newton, Mass. 02159; William Pilson, 31 High Plain St., Sharon, Mass. 02067; William J. Stephens, 27 Stanhope St., Boston, Mass. 02116; Charles H. Chandler, 80 Boundary St., Malden, Mass. 02148

[21] Appl. No.: 549,453

[22] Filed: Nov. 7, 1983

[51] Int. Cl.⁴ ............................................. B62K 15/00
[52] U.S. Cl. .................................. 280/278; 74/551.3; 280/287
[58] Field of Search ............... 280/287, 278; 74/551.3, 74/551.5, 551.7, 594.7, 501.5 R; 297/195, 203; 403/354; 24/68 CD, 490, 580

[56] References Cited

U.S. PATENT DOCUMENTS

| | | | |
|---|---|---|---|
| 2,366,061 | 12/1944 | Schwinn | 74/551.3 |
| 2,536,466 | 1/1951 | Rippenbein | 74/594.7 |
| 3,542,145 | 11/1970 | Proffer | 280/278 X |
| 3,759,352 | 9/1973 | Toplis | 74/501.5 R |
| 3,990,717 | 11/1976 | Best | 280/287 X |
| 4,202,561 | 5/1980 | Yonkers | 280/287 X |
| 4,421,357 | 12/1983 | Shimano | 297/195 |
| 4,433,852 | 2/1984 | Hon | 280/287 X |

FOREIGN PATENT DOCUMENTS

| | | | |
|---|---|---|---|
| 2263655 | 7/1974 | Fed. Rep. of Germany | 280/287 |
| 450313 | 3/1913 | France | 280/287 |
| 369574 | 3/1939 | Italy | 280/287 |
| 3749 | of 1878 | United Kingdom | 280/287 |
| 1250876 | 10/1971 | United Kingdom | 280/287 |

Primary Examiner—John J. Love
Assistant Examiner—Charles R. Watts
Attorney, Agent, or Firm—Thomas C. Stover, Jr.

[57] ABSTRACT

The folding bicycle which includes front and rear wheels and a sprocket and pedal assembly mounted to a frame and a steering column and a seat column mounted to such frame, is provided wherein the seat column and the steering column fold into proximity with the frame and substantially in the plane of the frame, while the rear wheel and sprocket assembly pivot around the sprocket axis into proximity with the frame and the front wheel, also in the plane of such frame.

The seat column has a bend or goose neck below the seat thereof to permit the seat column when folded toward the steering column, to curve around the base portion of the steering column and permit the steering column to fold thereover in planar proximity.

Other features of the planar folding bicycle include foldable handle bars and foldable pedals and a sprocket belt drive which is positioned against the drive gear of the rear wheel by an adjustable nip guide roll.

13 Claims, 18 Drawing Figures

FOLDING BICYCLE

BACKGROUND OF THE INVENTION

1. Field of the Invention

This invention relates to a folding bicycle: particularly a bicycle that folds into a compact configuration.

2. The Prior Art

Folding bicycles are commercially available and in significant use particularly where compact storage and improved portability are requirements. For example U.S. Pat. No. 3,362,725 and British Pat. No. 1,250,876 disclose bicycles that fold to bring the wheel closer edgewise but with the handlebars, seat and frame components projecting non-compactly therefrom. Further such prior art folding bicycles weigh between 20 to 40 lbs. or more which further increases the above carrying problem. Accordingly there is a need and market for a foldable bicycle which folds into a configuration of reduced size so as to substantially overcome the above prior art shortcomings.

There has now been developed an improved folding bicycle which folds into compact yet relatively thin configuration and which is of reduced weight for enhanced portability and storage thereof.

SUMMARY

Broadly the present invention provides a folding bicycle having a frame, front and rear wheels mounted thereto, a pedal sprocket and and pedal assembly mounted to the frame proximate the rear wheel, a steering column and handle bars mounted to the frame proximate the front wheel and a seat and seat column mounted to the frame proximate the rear wheel, the improvement comprising means for folding the steering column and the seat column into proximity with a portion of the frame and substantially in the plane of the frame.

Further, other components of the folding bicycle embodying the invention are believed novel including (a) the goose-neck shaped seat column for improved foldability, (b) the sprocket-rear wheel assembly which pivots about the pedal sprocket axis, (c) the manner in which the pedals fold, (d) a brake linkage junction which disconnects when the bicycle rear wheel is folded (on the pedal sprocket axis) and reconnects when the bicycle is unfolded into operational disposition, (e) an inside clamping mechanism for the steering and seat columns, (f) the adjustable seat positioning means and (g) a nip guide roller which holds the sprocket-rear wheel drive belt in close contact with the drive gear of the rear wheel.

BRIEF DESCRIPTION OF THE DRAWING

The invention will become apparent from the following detailed specification and drawings in which;

FIG. 17 is a fragmentary elevation view of a rear portion of the bicycle embodiment of the invention shown in FIGS. 1 and 2, and FIG. 18 is an elevation view of a further embodiment of the present invention.

DESCRIPTION OF PREFERRED EMBODIMENT

Figure 1:
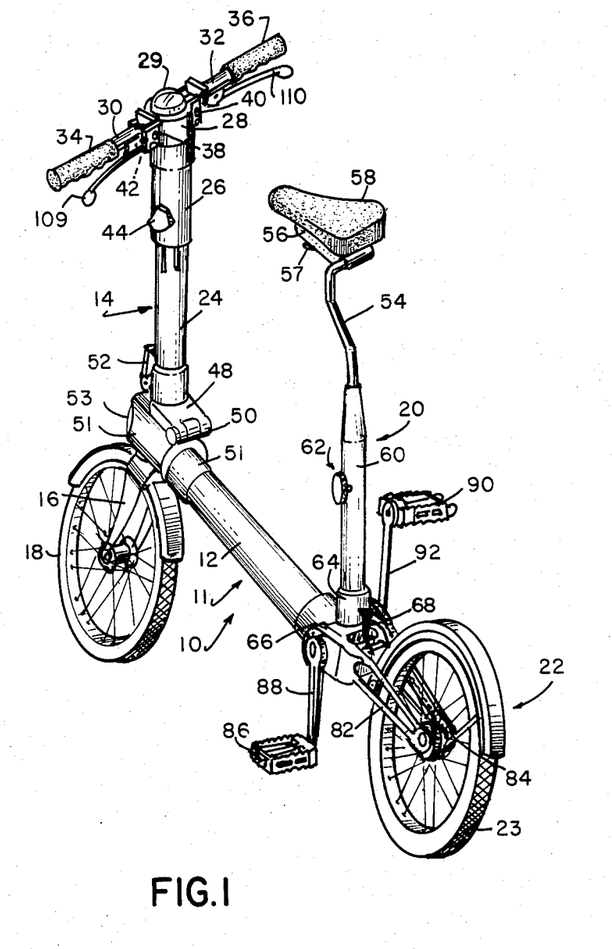
FIG. 1 is a perspective view of a folding bicycle embodying the present invention.
Figure 2:
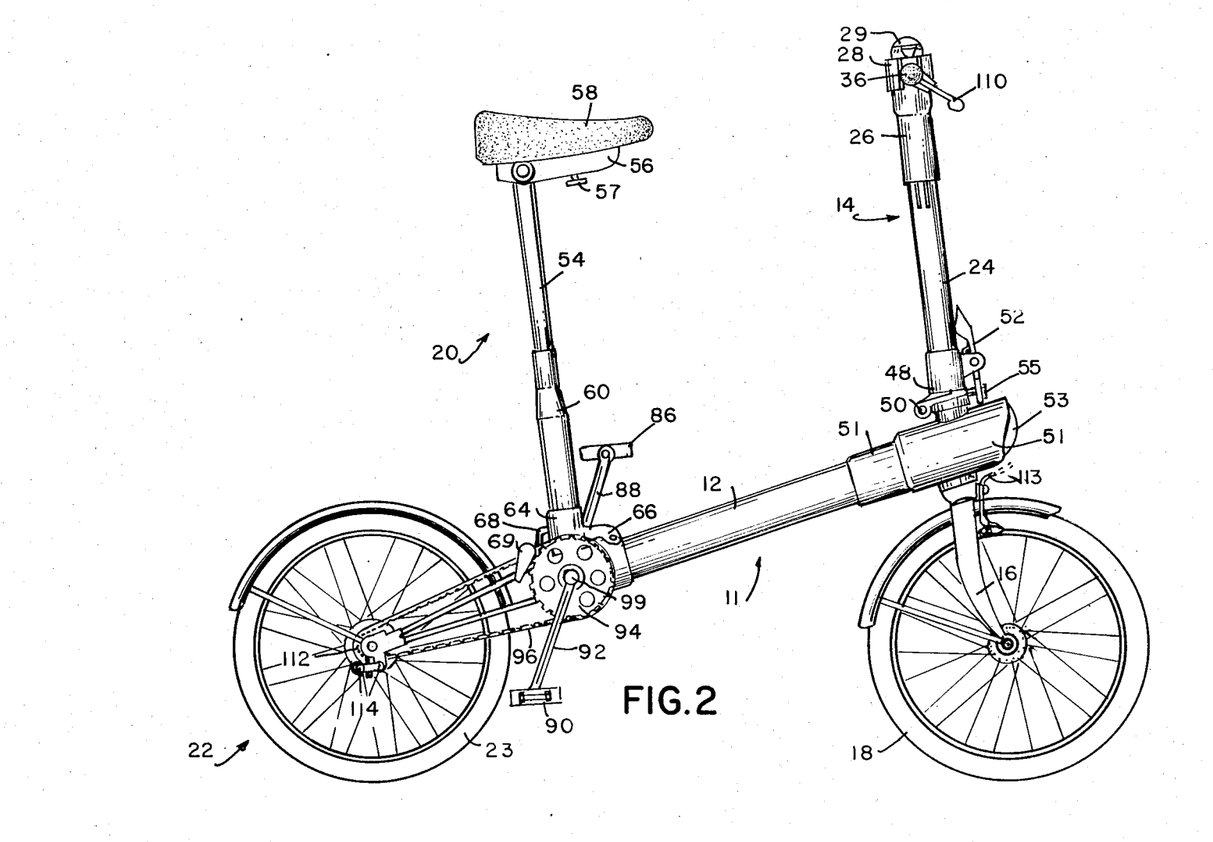
FIG. 2 is an elevation view of the folding bicycle embodiment shown in FIG. 1.

Referring in more detail to the drawings, the folding bicycle embodying the invention 10 has a frame 12, to which are mounted steering column assembly 14, steering fork 16 and steering wheel 18 and at the rear portion thereof, is mounted seat column assembly 20 and rear wheel, pedals and sprocket assembly 22, as shown in FIGS. 1 and 2.

Figure 4:
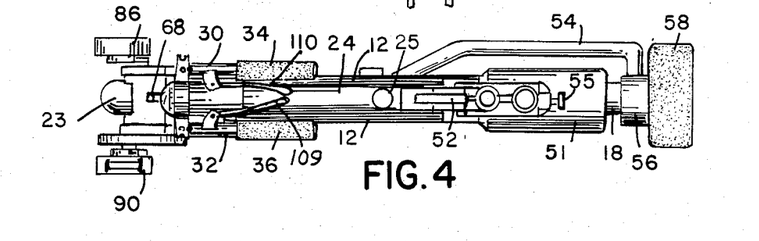
FIG. 4 is a plan view of the bicycle embodiment of FIG. 3 in the folded position.

The steering column assembly 14 has steering column 24, upper column sleeve 26 mounted thereover, handlebar support 28, handlebars 30 and 32 and handle grips 34 and 36, mounted thereon, as shown in FIGS. 1 and 4.

Figure 6:
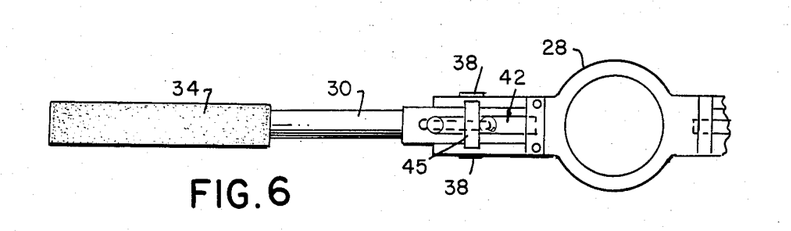
FIGS. 6, 7 and 8 are fragmentary elevation views of another forward component of the bicycle embodiment shown in FIG. 1.
Figure 7:
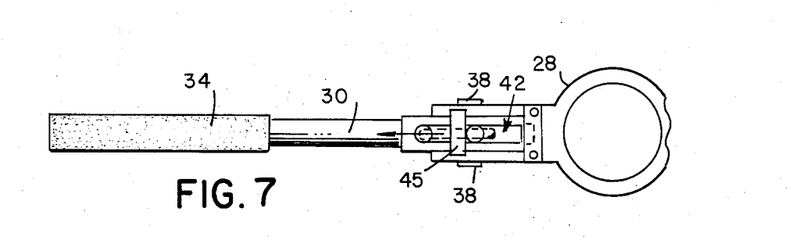
Figure 8:
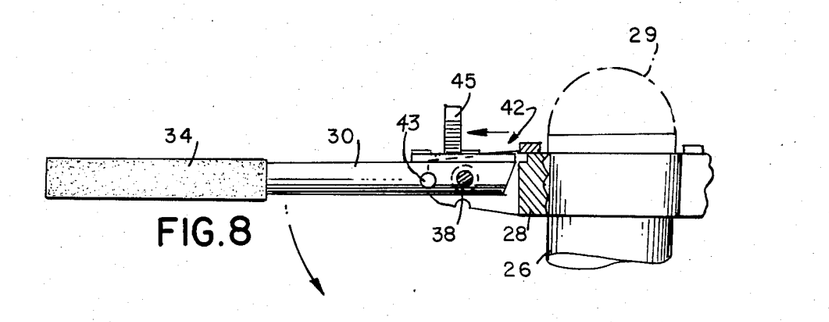

The handlebars 30 and 32 pivot respectively, on pins 38 and 40 mounted in the holder 28 and lock into the extended operational position by spring latch means 42, having handle 45, shown in FIGS. 6, 7 and 8. The steering column sleeve 26 is adjusted to a desired height on the steering column 24, by inside adjustable clamping device 44, to be more fully described below.

Figure 15:
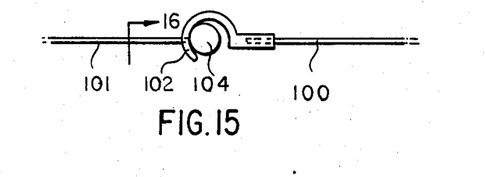
FIGS. 15 and 16 are fragmentary elevation views of portions of the components shown in FIG. 14.

The steering column assembly further includes hingeable column support 48 and hinge 50, mounted to the frame 12, as shown in FIG. 1 and steering column latch 52, as shown in FIGS. 2 and 15.

Figure 5:
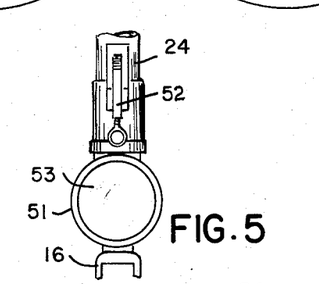
FIG. 5 is a fragmentary elevation view of a forward portion of the bicycle embodiment shown in FIG. 1.

If desired, a compass 29 or a speedometer, not shown, can be mounted atop the steering column 14 as shown in FIG. 1 and a light 53 mounted at the forward end of the frame support sleeve 51, as shown in FIGS. 2 and 5.

Figures 9, 10, 11, 12:
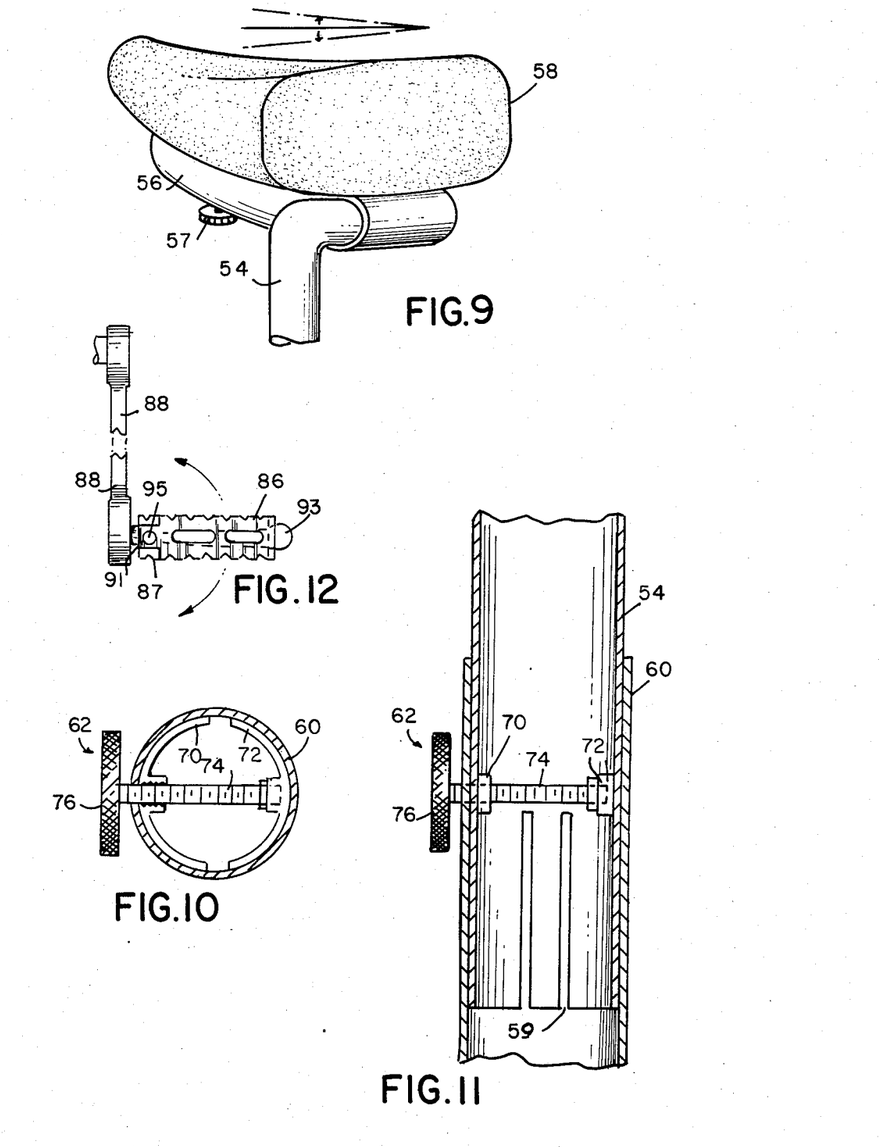
FIG. 9 is a fragmentary perspective view of another component of the bicycle embodiment shown in FIG. 1.
FIG. 10 is a plan view, partially in cross-section, of still another component of the bicycle embodiment in FIG. 1.
FIG. 11 is a fragmentary elevation view, in partial section, of the component shown in FIG. 10.
FIG. 12 is a fragmentary elevation view of a component of the bicycle embodiment shown in FIG. 1.

The seat column 20 includes goose neck shaft 54 surmounted by seat pan 56 and seat 58, as shown in FIGS. 1 and 9. The goose neck 54 fits into hollow seat column member 60, which has an inside adjustable clamp 62 (more fully described below), as shown in FIGS. 1 and 2. The seat column sleeve 60 is mounted on hingeable column support member 64 and has hinge 66, mounted in turn to the frame 12, as shown or indicated in FIGS. 1 and 2. Spring latch 68 contacts the support member 64 to secure the seat column in the unfolded operational position, as shown or indicated in FIGS. 1 and 2.

As noted above, the steering column 14 is hingeably mounted to frame support sleeve 51, as shown in FIGS. 1 and 2. The frame support sleeve 51, the frame shaft 12 and the seat column support member 64 together form the frame 11 of the bicycle 10 embodying the invention.

The seat 58 is mounted on curved seat pan 56, by which the seat 58 is moved to various positions on the curved seat pan 56, to change the angle and position of the seat for rider comfort. The seat 58 is then tightened to the seat pan 56 by threaded screw 57, as indicated in FIG. 9.

The height of the steering column 14 and seat column (or goose-neck) 54 are set by an adjustable inside clamp 44 or 62, as noted above. The inside clamp 62 (or 44) includes a first clamping member 70 and a second clamping member 72, mounted in opposed spaced relationship within column 60 (or 24) as shown in FIGS. 10 and 11. The clamping member 70 has a threaded aperture therein (not shown), through which passes threaded shaft 74, in threaded engagement therewith, which shaft connects to thumb screw handle 76, as shown in FIGS. 10 and 11.

In operation, turning the thumb screw 76 extends the threaded shaft 74 against the clamping member 72 and presses the pair of clamping members 70 and 72 against the inside walls of the inside sleeve, to press such inside sleeve against the outer sleeve, e.g. inner sleeve 54 against outer sleeve 60, to lock the two sleeves in a desired position. Advantageously, the inner sleeve e.g. sleeve 54 has slots 59 therein to permit expansion of such slotted inner sleeve against the outer sleeve e.g. sleeve 60 as indicated in FIG. 11.

Accordingly by turning the thumb screw, the inner clamp assembly is tightened or loosened to permit adjustments respectively of the height of the steering column e.g. by inner clamp assembly 44 or to adjust the height of the seat column, e.g. by adjustment of the inner clamp assembly 62, as indicated in FIGS. 1, 10 and 11.

The rear wheel assembly 22 includes rear wheel 23 mounted by struts 82 and 84 to the frame 11 as shown in FIGS. 1 and 2.

The pedal 86 and crank arm 88 and pedal 90 and crank arm 92, are mounted to the sprocket assembly 94, which is mounted in turn to the frame 11 of the bicycle, as shown in FIGS. 1 and 2. The rear wheel assembly 22 and the seat column assembly 20 are held together, in the extended position, by spring lock 68, as shown in FIGS. 1 and 2. The hingeable steering column 14 is held in the upright extended position by latch 52, as shown in FIGS. 2 and 6.

The pedal sprocket 94 is connected by endless chain or belt 96 to the hub 98 of the rear wheel 23, as shown in FIGS. 1, 2 and 17. In operation, rotation of the pedals 86 and 90 turns the crank arms 88 and 92, rotates the sprocket 94, the endless belt 96 and the rear wheel 23, to propel the bicycle.

Figure 3:
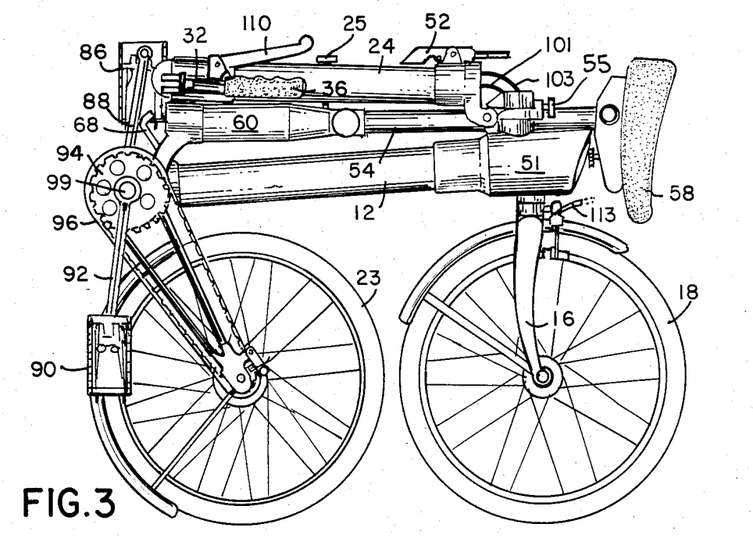
FIG. 3 is an elevation view of the folding bicycle embodiment of FIGS. 1 and 2 in a folded configuration.

To fold the bicycle, one releases the rear wheel assembly latch 68 and pivots the rear wheel assembly 22 on the sprocket axis 99, under the frame 11 and toward the front wheel 18 to the position shown in FIG. 3.

Concurrently or subsequently, the seat column 20 is pivoted at hinge 66 toward the steering column 14, and the bent goose neck 54 of the seat column 20, fits around the base 48 of the steering column 14, with the seat 58 positioned in front of such steering column 14, as shown in FIGS. 4 and 3.

Thereupon the latch 52 of the steering column 24 is opened from its hook 55, shown in FIGS. 2 to 5 and the steering column is pivoted at hinge 50, toward the sprocket 94 so that it overlies the folded seat column 20, as shown in FIGS. 4 and 3.

Figure 13:
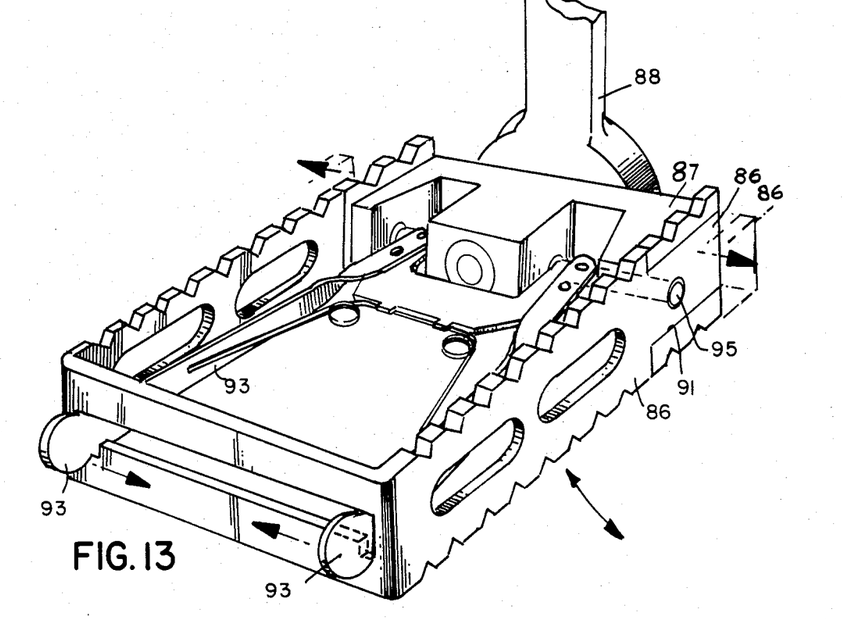
FIG. 13 is a fragmentary plan view impartial section, of a portion of the bicycle component shown in FIG. 12.

Previously or subsequently the handlebars 30 and 32 are released from spring loaded latching means 42 shown in FIGS. 6, 7 and 8 and pivoted on pins 38 and 40 into the folded position, as shown or indicated in FIGS. 1, 4 and 3. The handle bars are held folded e.g. by detent grommet 43 shown in FIG. 8. Likewise the pedals e.g. pedal 86, (spring-mounted to pedal base 87, having channel 91 and mounted on crank-arm 88) is spread by hand or spring lever means 93, shown in FIGS. 3 and 13, so as to clear the channel 91 and permit such pedal 86 to pivot on pin 95 into the folded position for such pedal as shown in FIGS. 12 and 13 and indicated in FIG. 3.

Figure 14:
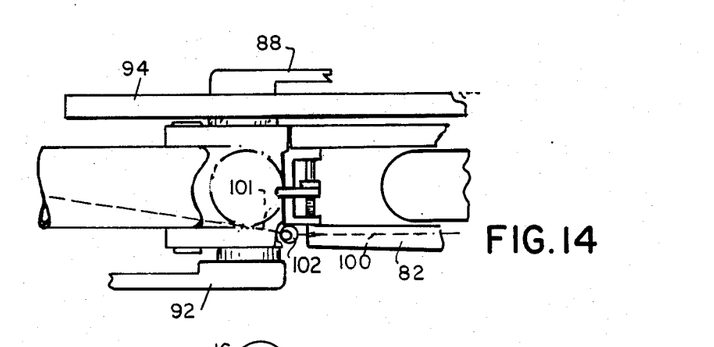
FIG. 14 is a fragmentary plan view in partial section of another component of the bicycle embodiment shown in FIG. 1.
Figure 16:
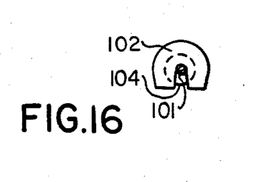

A further novel feature of the invention is the disconnectable brake cable between the frame assembly 11 and the rear wheel assembly 22, as shown in FIGS. 14, 15 and 16. Accordingly the lower brake cable 100 extends through the hollow strut 82 to a rear wheel braking means (not shown) mounted on the hub of the rear wheel 23, shown e.g. in FIGS. 1 and 14. The other end of such brake cable 100 is connected to a ball hook 102, as shown in FIGS. 14, 15 and 16.

Mounted partially within at that portion of the frame 11 proximate the sprocket 94 is the rearward segment of the upper brake cable 101, which terminates in a ball 104, as shown in FIG. 14. The ball 104 is positioned to engage the hook 102, as shown in FIGS. 14, 15 and 16, when the rear wheel has been unfolded and extended to its operational position shown in FIG. 2. The hook 102 and ball 104 disengage when the rear wheel assembly 22 is pivoted to the folded position shown in FIG. 3.

The upper brake cable 101 extends through the hollow frame member 12 and up the steering column member 24 to brake lever 110, mounted on handlebar 32, as indicated in FIGS. 1 and 2. The front brake cable 103 extends directly from the other brake lever 109 on handlebar 30, through the steering column 24 to the brake 113, mounted on the front wheel 18, as shown or indicated in FIGS. 1, 3 and 2.

A threaded connecting pin 25, mounted in a threaded aperture (not shown) in steering column 24, in alignment with a threaded aperture in the seat column 60, unites the two columns, which helps secure the bicycle in the folded position shown in FIG. 3.

The folding bicycle of the invention can accordingly be folded in a relatively narrow plane as indicated in FIGS. 3, 4 and 5 and can be placed in a carrying bag 120 (similar to a garment bag) which has a carrying strap 122, a storage hook 124, and a handle aperture or window 126 and a mailing label 128, as shown in FIG. 18, to enable the so-bagged (and folded) bicycle to be sent through the mail in the manner of a large manilla envelope.

Accordingly the bicycle of the invention folds into a thin, flat and compact package that is highly portable and readily shipped or stored.

The bicycle components including the frame, steering column and seat column and other components are made of metal such as steel or aluminum and alloys thereof and preferably are made of high strength aluminum alloys. Frame stiffness is achieved through use of large diameter tubing e.g. from $1\frac{3}{4}$ to $3\frac{1}{4}$ inches o.d., at a wall thickness of 0.035 to 0.065 inch or more, e.g. for the frame, steering column or lower seat column.

Also the belt is guided into the pedal sprocket 94 by belt guard 69, or shown in FIG. 2, which guard also prevents garments from catching between the belt and sprocket.

Other portions of the bicycle embodying the invention such as the handlebars, seat, and pedals can be made of plastic and preferably are made of high modulus plastics, ie. plastic alloyed with glass or carbon fiber.

An endless chain can connect the bicycle sprocket 94 to the rear wheel drive gear 112, shown in FIG. 17, i.e. the typical metal link bicycle chain. However, such chain is advantageously replaced in the bicycle of the present invention with an endless high strength belt, eg of plastic, having inner teeth to engage the rear wheel drive gear 112, e.g. a high performance urethane endless belt with gear engaging teeth 111 on the inside perimeter thereof, e.g. the belt 96 shown in FIGS. 2 and 17.

The plastic belt 96 is held against the rear wheel drive gear 112 by nip roller 114, which is adjustably mounted on the strut 84 and can be tightened against the belt (by turning the nut 116 in the threaded eyebolt 118), as shown or indicated in FIG. 17.

Also the belt is guided into the pedal sprocket 94 by belt guard 69, as shown in FIG. 2, which guard also prevents garments from catching between the belt and the sprocket.

As discussed above, the bicycle of the invention has a novel folding geometry that permits folding and unfolding thereof in under 10 seconds. The bicycle folds in a single plane and defines a folded envelope of compact size e.g. of 32 in.×24 in.×6¾ in. wide. This slimness of width profile enhances portability, storage and shipping and permits the bicycle to be hand-carried on all forms of public transportation and even sent through the mail as discussed above.

A further novel feature of the bicycle of the invention is that the seat column includes a goose-neck, as discussed above, which enables the seat column to be folded around the base of the steering column so that the seat is positioned in front thereof and out of the way, permitting the steering column to be folded thereover in the same plane. The handlebars fold to the steering column and the pedals fold to the crank arm, as discussed above, further enhancing the thinness of the folded unit. In further novelty, the rear wheel and endless belt drive assembly pivots on the pedal sprocket axis and pivots under the bicycle frame in the plane thereof, to complete the slim, compact folded unit e.g. as shown in FIGS. 3 and 4 and 5.

Various fastening means can be used to secure the so-folded bicycle components, such as the locking screw 25 discussed above and shown in FIG. 3, the handle bar detents 43 discussed above or by rope or shock cord, tied around the frame, seat column and steering column. Further, if desired, a rope or shock cord can secure other bicycle components such as the two wheels.

The folding bicycle of the invention can have various sized wheels, smaller or larger than those illustrated in the drawing, can have varying shaped handlebars of larger or smaller size and preferably foldable. Further the sprocket and rear wheel assembly can include multi-speed sprockets and gear shifting means if desired, within the scope of the invention.

The bicycle of the invention can have continuous brake cables going from the handlebars to the front and rear wheels with slack thereof to permit folding especially of the rear wheel. Preferably, however, the rear wheel brake cable divides into forward and rear cable segments which are separated when the rear wheel is folded and joined (by cooperating and connecting mechanisms, e.g. ball and hook fittings), when the rear wheel is unfolded and extended into operating position e.g. as shown in FIGS. 1 and 2. In such case when the cable segments are joined, both segments of the brake cable move as one when tension is applied to or released from the forward brake cable segment at the handlebar lever, as discussed above. Preferably all the brake cables run through the hollow tubing of the bicycle components e.g. as indicated in FIGS. 2 3, and 14.

The height of the respective telescoping steering column or seat column are each preferably adjusted by the inside clamping means discussed above. However, various internal or external clamping or threaded gripping means can be employed, to adjust the height of the steering and seat columns, as desired within the scope of the invention.

The foldable bicycle of the invention thus constructed of lightweight materials and of weight-saving, novel folding configuration, folds into a highly lightweight, compact and thin package. The production folding bicycles of the prior art weigh between 20 to 39 lbs., while the bicycle of the present invention, with 14 in. wheels, weighs under 15 lbs., e.g. between 14.2 and 14.9 lbs., as a production model and is expected to be the world's lightest production bicycle.

Accordingly, the folding bicycle of the invention features several novelties including:

(1) that it folds in a single plane;
(2) the goose neck shape of the seat column;
(3) the pivoting of the rear wheel assembly about the pedal sprocket axis;
(4) the folding pedal design;
(5) the connect-disconnect, brake cable linkage;
(6) the location of the rear brake cable segment inside a rear wheel support strut;
(7) the inside clamping means within their respective columns, and
(8) the adjustment of the seat angle on the dished or curved support.
(9) the endless belt between the pedal sprocket and rear wheel drive gear as guided thereon by a nip roller.

What is claimed is:

1. A folding bicycle having a frame, front and rear wheels mounted thereto, a pedal sprocket and pedal assembly mounted to said frame proximate said rear wheel, a steering column and handle bars mounted to said frame proximate said front wheel and a seat and seat column mounted to said frame proximate said rear wheel, the improvement comprising means for folding said steering column and said seat column into proximity with a portion of said frame and substantially in the plane of said frame, and means for positioning sid rear wheel such that said front and rear wheels are disposed entirely below said frame and substantially in the plane of said frame when the bicycle is folded, such that said front and rear wheels remain free to roll.

2. The folding bicycle of claim 1 in which said steering column and said seat column are hingeably mounted to said frame and pivot into proximity with a portion of said frame.

3. The folding bicycle of claim 2 wherein said steering column and said seat column pivot toward each other and said seat column has a bend or goose neck below said seat to permit the seat column when fully folded to curve around the base portion of the steering column in close, non-interfering proximity therewith.

4. The folding bicycle of claim 1 wherein said rear wheel and sprocket assembly are hingeably mounted to the frame and pivot around the axis of said sprocket into proximity with said frame and said front wheel in a folded position.

5. The folding bicycle of claim 1 having a pedal on a crank arm mounted to the sprocket assembly, said pedal being foldable to said crank arm for folding proximate thereto.

6. The folding bicycle of claim 1 wherein handle bars are mounted to the upper portion of said steering column, which handle bars are foldable into proximity with said steering column.

7. The folding bicycle of claim 2 wherein a brake cable connects by way of a connect-disconnect mechanism to a braking means for said rear wheel, which mechanism is located on the frame at the hingeable portion of said rear wheel assembly and comprises a pair of cable segments, one of which terminates in a ball, the other of which terminates in a ball hook, said ball being positioned to engage said hook when said rear wheel assembly is pivoted into the operational position such that both segments of said brake cable move as a unit when tension is applied to or released from said brake cable, said ball and hook detaching from one another and disconnecting the brake cable segments when said rear wheel assembly is folded toward said frame.

8. The folding bicycle of claim 7 wherein said rear brake cable segment extends from said mechanism to inside a hollow rear wheel support strut to the rear wheel brake.

9. The folding bicycle of claim 2 wherein after said steering column and said seat column are folded into proximity, a fastening means releaseably joins said columns together.

10. The folding bicycle of claim 1 wherein said seat is moveably mounted on a curved support such that said seat can be moved on said support to change the angle or pitch thereof, said seat support having clamping means to releasably clamp said seat in place on said support at the desired pitch.

11. The folding bicycle of claim 1 wherein said steering column and said seat column each include an extender member which extends within a hollow support member and an inside clamping means is mounted within said extender member and can be spread apart to clamp the extender member against the inner walls of the hollow support member to adjust the height of the steering column and/or the seat column as desired.

12. The folding bicycle of claim 1 wherein an endless belt connects said sprocket and a drive gear mounted on said rear wheel and a guide nip roll is mounted to the rear wheel support to press said belt into close contact with said drive gear.

13. The folding bicycle of claim 1 wherein said front and rear wheels, when folded, are disposed entirely below said frame, said steering column and said seat column, which columns fold above said frame.

* * * * *